(12) United States Patent
Steele et al.

(10) Patent No.: US 11,503,954 B2
(45) Date of Patent: Nov. 22, 2022

(54) CABINET WITH OPPOSED AIR CURTAINS

(71) Applicant: THE ALAN NUTTALL PARTNERSHIP LIMITED, Hinckley (GB)

(72) Inventors: Michael Steele, Hinckley (GB); Alan Nuttall, Hinckley (GB)

(73) Assignee: THE ALAN NUTTALL PARTNERSHIP LIMITED, Hinckley (GB)

( * ) Notice: Subject to any disclaimer, the term of this patent is extended or adjusted under 35 U.S.C. 154(b) by 178 days.

(21) Appl. No.: 16/636,253

(22) PCT Filed: Aug. 6, 2018

(86) PCT No.: PCT/GB2018/052240
§ 371 (c)(1),
(2) Date: Feb. 3, 2020

(87) PCT Pub. No.: WO2019/025822
PCT Pub. Date: Feb. 7, 2019

(65) Prior Publication Data
US 2020/0367694 A1    Nov. 26, 2020

(30) Foreign Application Priority Data

Aug. 4, 2017 (GB) ..................... 1712559

(51) Int. Cl.
*A47J 39/00* (2006.01)
*A47F 3/00* (2006.01)
(Continued)

(52) U.S. Cl.
CPC ............. *A47J 39/003* (2013.01); *A47F 3/001* (2013.01); *A47F 3/063* (2013.01); *A47F 3/14* (2013.01);
(Continued)

(58) Field of Classification Search
CPC .......... A47J 39/00; A47J 39/02; A47J 39/025; A47J 39/003; A47F 3/001; A47F 3/063;
(Continued)

(56) References Cited

U.S. PATENT DOCUMENTS 3,628,447 A * 12/1971 Levenback ............. A47J 37/06
99/341
3,632,968 A * 1/1972 Wilson .................... A47J 39/02
219/214
(Continued)

FOREIGN PATENT DOCUMENTS

KR    200450319 Y1    9/2010
WO   2017073951 A1    5/2017

OTHER PUBLICATIONS

GB Search Report for GB1712559.2, dated Feb. 1, 2018, 4 pages.
(Continued)

*Primary Examiner* — Patrick D Hawn
(74) *Attorney, Agent, or Firm* — Cozen O'Connor

(57) ABSTRACT

The present invention provides a cabinet (10) for the temporary storage of a heated food item. The cabinet (10) has a in base (12), a top (14) and opposing sides (16,18). The base (12), top (14) and opposing sides (16,18) define an interior space (20) of the cabinet (10) which is accessible through opposing apertures (22, 24) at each end of the cabinet (10). The cabinet (10) is provided with air movement means and air heating means operable to draw air from the interior space (20) of the cabinet (10), heat said air and utilise a portion of said heated air to produce air curtains across the opposing apertures (22, 24) of the cabinet (10). The remainder of said air is circulated within the interior space (20) of the cabinet (10).

13 Claims, 16 Drawing Sheets

(51) Int. Cl.
*A47F 3/06* (2006.01)
*A47F 3/14* (2006.01)
*A47F 7/00* (2006.01)
*B65G 13/00* (2006.01)
*H05B 3/00* (2006.01)

(52) U.S. Cl.
CPC ............ *A47F 7/0071* (2013.01); *B65G 13/00* (2013.01); *H05B 3/0014* (2013.01)

(58) Field of Classification Search
CPC ......... A47F 3/14; A47F 7/0071; B65G 13/00; H05B 3/0014
See application file for complete search history.

(56) References Cited

U.S. PATENT DOCUMENTS

| | | | | |
|---|---|---|---|---|
| 3,778,964 | A * | 12/1973 | Rowland | B65B 53/02 219/388 |
| 3,942,426 | A | 3/1976 | Binks et al. | |
| 4,074,108 | A * | 2/1978 | King | A47J 36/2483 219/214 |
| 4,165,620 | A | 8/1979 | Eberhardt et al. | |
| 4,267,706 | A | 5/1981 | Abraham | |
| 4,343,985 | A * | 8/1982 | Wilson | A47J 36/2488 219/214 |
| 4,437,396 | A * | 3/1984 | Plattner | A47J 39/003 219/388 |
| 5,505,122 | A * | 4/1996 | Gerrit | A47J 39/003 126/19.5 |
| 6,114,659 | A * | 9/2000 | Finck | A47F 3/0447 219/214 |
| 6,261,621 | B1 * | 7/2001 | Stanger | A47J 36/2483 219/214 |
| 6,367,274 | B1 * | 4/2002 | Mellado | A47F 3/0447 62/255 |
| 6,627,855 | B2 * | 9/2003 | Hohler | A47F 3/001 219/214 |
| 7,829,823 | B2 * | 11/2010 | Nuttall | A47F 10/06 219/214 |
| 8,134,101 | B2 * | 3/2012 | Majchrzak | F24C 15/02 219/400 |
| 8,362,404 | B2 * | 1/2013 | Emerich | A47J 39/006 219/400 |
| 8,437,627 | B1 * | 5/2013 | Magner | A47J 36/24 392/382 |
| 8,895,902 | B2 * | 11/2014 | Shei | A21B 1/245 219/400 |
| 9,027,470 | B1 * | 5/2015 | Magner | A47J 39/003 99/483 |
| 9,149,154 | B1 * | 10/2015 | Stuck | A47J 39/003 |
| 9,462,897 | B2 * | 10/2016 | Nuttall | A47F 7/0071 |
| 9,565,954 | B2 * | 2/2017 | Nuttall | A47F 3/001 |
| 9,962,037 | B2 * | 5/2018 | Magner | A47J 39/003 |
| 11,045,018 | B2 * | 6/2021 | Berents | A47F 3/005 |
| 2002/0005686 | A1 * | 1/2002 | Nuttall | A47F 3/001 312/236 |
| 2006/0059934 | A1 * | 3/2006 | Howington | A47B 57/045 62/256 |
| 2009/0139976 | A1 * | 6/2009 | Lee | A21B 1/245 219/400 |
| 2012/0051722 | A1 * | 3/2012 | Humphrey | A47J 36/24 392/379 |
| 2014/0096689 | A1 * | 4/2014 | Stolle | A47J 36/2483 99/483 |
| 2014/0097355 | A1 | 4/2014 | Stolle | |
| 2014/0292168 | A1 * | 10/2014 | Nevarez | A47J 39/003 312/236 |
| 2016/0235218 | A1 * | 8/2016 | Nuttall | A47F 3/001 |

OTHER PUBLICATIONS

International Search Report for PCT/GB2018/052240, dated Oct. 11, 2018, 4 pages.
Written Opinion for PCT/GB2018/052240, dated Oct. 11, 2018, 3 pages.

* cited by examiner

CABINET WITH OPPOSED AIR CURTAINS

The present invention relates to a cabinet for the temporary storage of a heated food item. More specifically, the present invention relates to a cabinet for the temporary storage of a heated food item wherein the cabinet is operable to retard the cooling of the heated food item by the circulation of heated air over and around the food item.

Changes in working patterns have led to changes in eating habits particularly with respect to what might be called the traditional evening meal where a family sits around a table and eats home-cooked food. It is now becoming increasingly commonplace for convenience meals to be eaten in the evening while watching television from an easy chair. That has, in turn, led to an increase in take-away food outlets where a person can collect a hot ready-cooked meal to eat at home.

For some time, supermarkets have offered a range of prepared food which can be taken home, heated or cooked, and then eaten. However, there is now increasing competition from take-away food outlets which supermarkets would like to address by supplying hot ready-cooked meals themselves. One of the problems faced by supermarkets is how to keep such food hot whilst making it readily accessible to customers and an object of the present invention is to provide a cabinet which will be suitable for such a purpose.

In addition to the collection of food from supermarkets, there has also been an increase in the ordering of cooked food products via the internet for home delivery. Typically a consumer will utilise the services of an online food delivery business to have food from a consumer specified restaurant delivered to their home. Delivery to the consumer may be undertaken by delivery drivers or cyclists who collect the cooked food products from a kitchen. The kitchen may be the kitchen of a restaurant. Alternatively the kitchen may be dedicated to the provision of restaurant style cooked food products for home delivery.

The delivery drivers or cyclists are provided with apparatus such as insulated containers which retard the cooling of the cooked food products during the delivery phase, however there has been identified a need to retard the cooling of the cooked food products in the period after cooking and before collection by a delivery driver or cyclist.

According to the present invention there is provided a cabinet for the temporary storage of a heated food item, the cabinet having a base, a top and opposing sides, wherein the base, top and opposing sides define an interior space of the cabinet which is accessible through opposing access apertures at each end of the cabinet, wherein the cabinet is provided with air movement means and air heating means operable to draw air from the interior space of the cabinet, heat said air and utilise said heated air to produce air curtains across the opposing access apertures of the cabinet, wherein the width of the interior space between the side walls narrows to a throat at a point approximately midway between the opposing access apertures.

The present invention provides a cabinet having an interior space that is readily accessible through the apertures to allow a food item to be placed into and thereafter removed from the interior space. The heated air curtains allow the interior space of the cabinet to be maintained at an elevated temperature compared to the ambient temperature surrounding the cabinet.

The narrowing of the interior space to a throat at a midway point between the opposing access apertures may serve to align food product containers during their passage through the chamber from one access aperture to the other. For example, the width of the throat may be approximately equal to the width of a pizza box. Alignment of food product containers in the manner described above may also prevent the occlusion of apertures through which air is drawn from the interior space by the air movement means.

The air movement means may comprise an electrically operated fan. The air heating means may comprise an electrically operated heating element. The air movement means may be positioned behind a side wall of the cabinet. In such an embodiment the side wall may be provided with one or more apertures which allow fluid communication between the interior space of the cabinet and the air movement means.

The cabinet of the present invention may have a single fan and heating element behind each side wall of the cabinet. In an alternative embodiment of the present invention, there may be provided multiple fans and heating elements behind each side wall.

The cabinet may be provided with a chamber located above the top of the interior space which, in use, receives heated air from the air movement means. The chamber may be provided with slots positioned above the access apertures, wherein the slots are configured to direct heated air from the chamber across the access apertures to form the air curtains. Such slots may extend substantially across the width of the chamber. It will thus be appreciated that each slot can create an air curtain that extends substantially fully across an access aperture of the cabinet.

Embodiments of the present invention will now be described with reference to the accompanying drawings in which.

Figure 1:
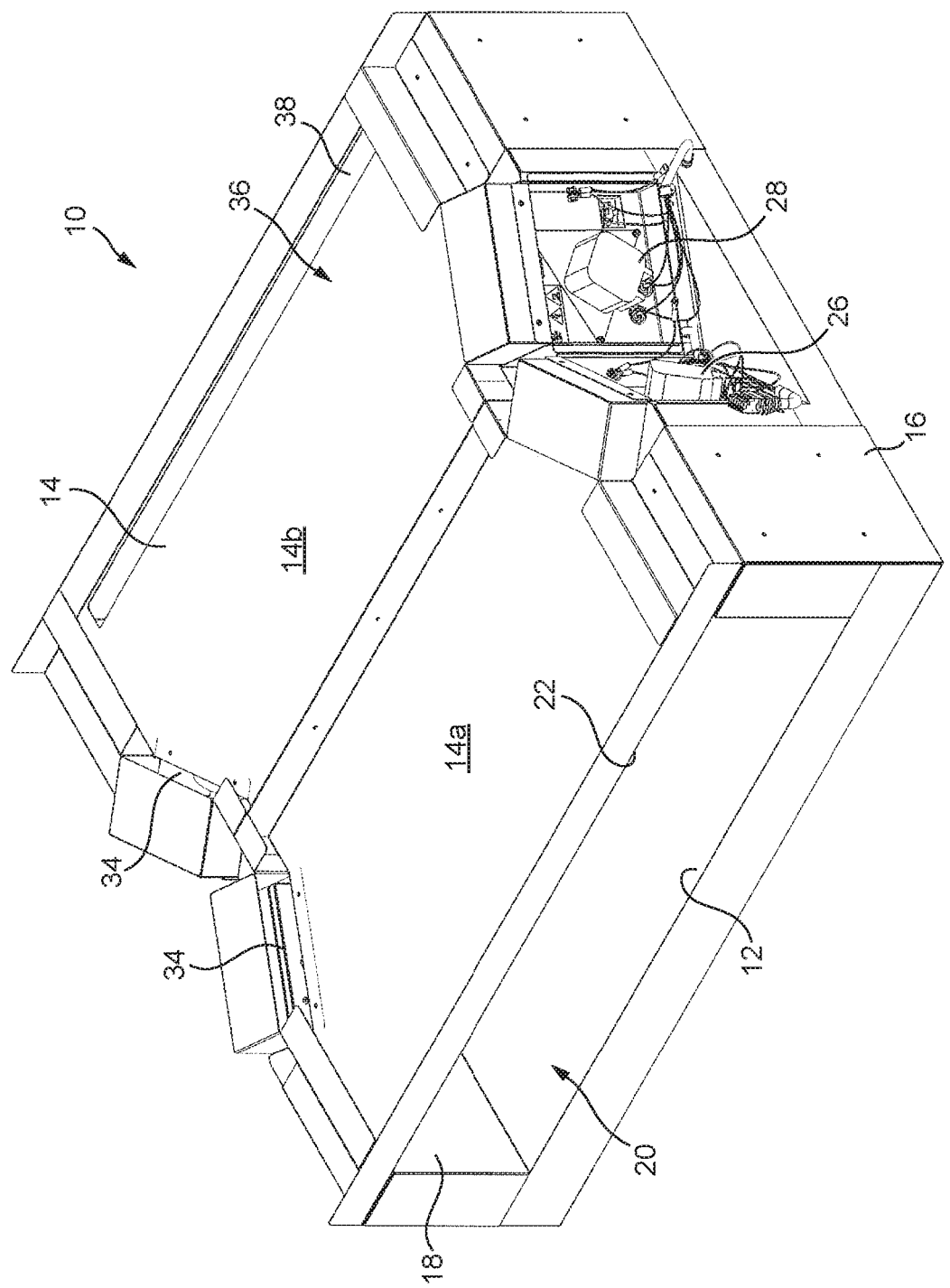
FIG. 1 shows a perspective view of a partially completed cabinet according to an embodiment of the present invention.
Figure 2:
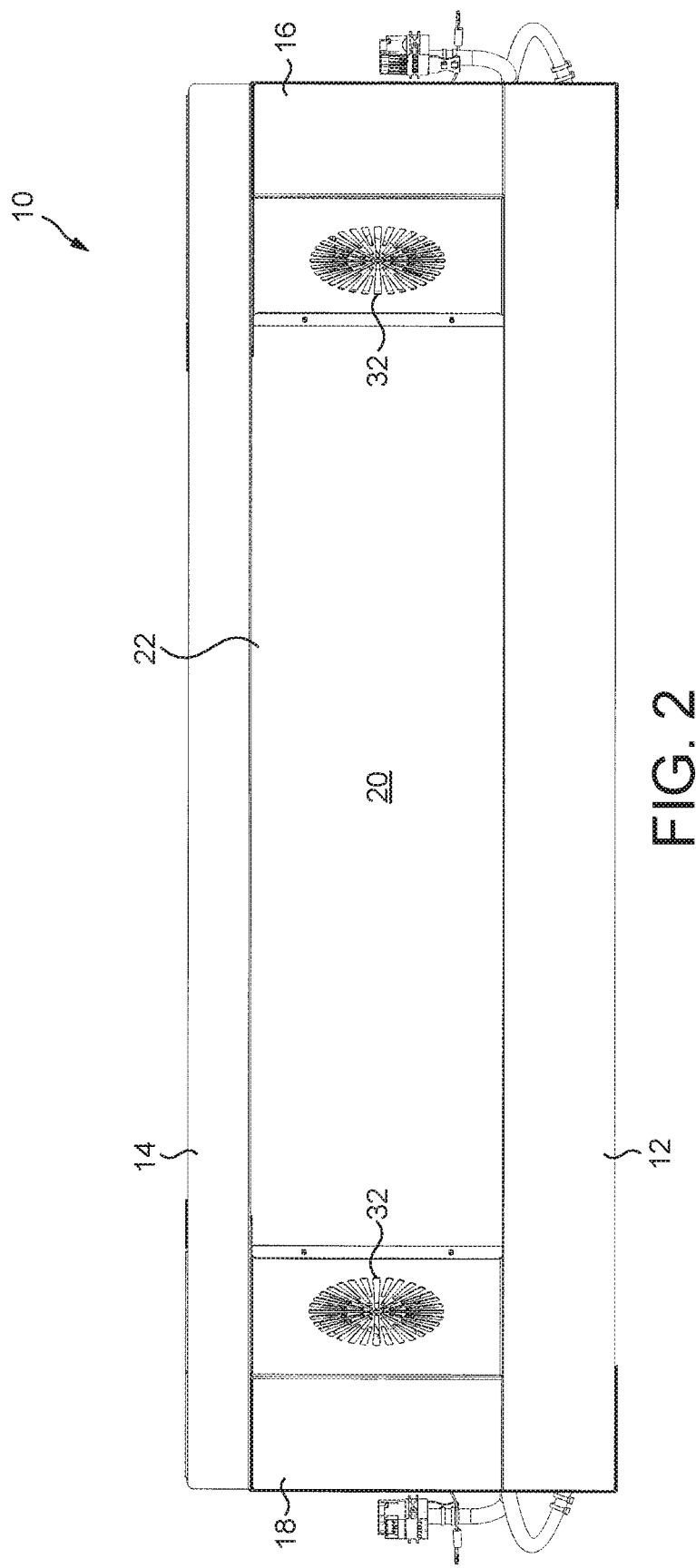
FIG. 2 shows an end view of the cabinet of FIG. 1.
Figure 3:
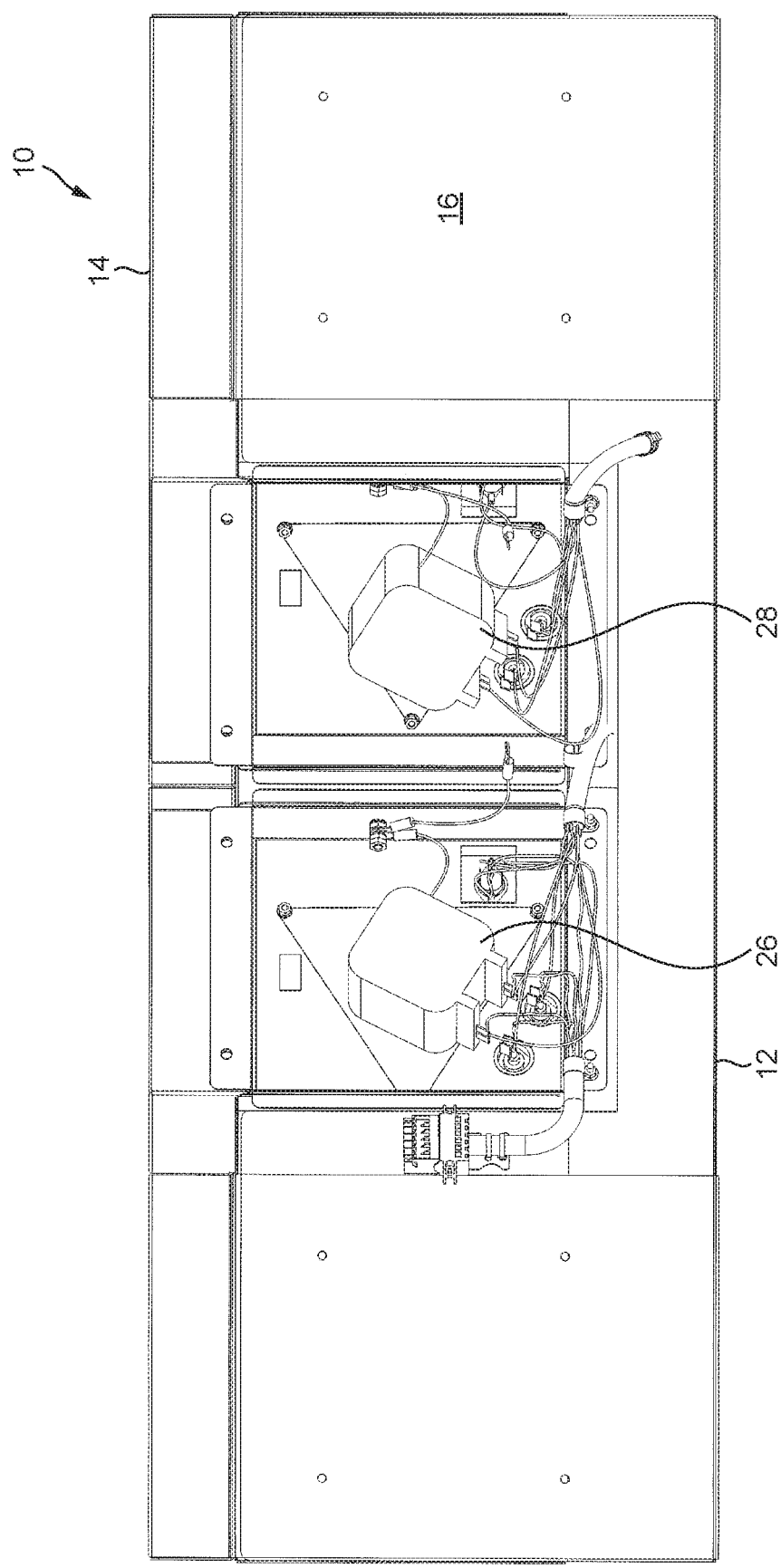
FIG. 3 shows a side view of the cabinet of FIG. 1.
Figure 4:
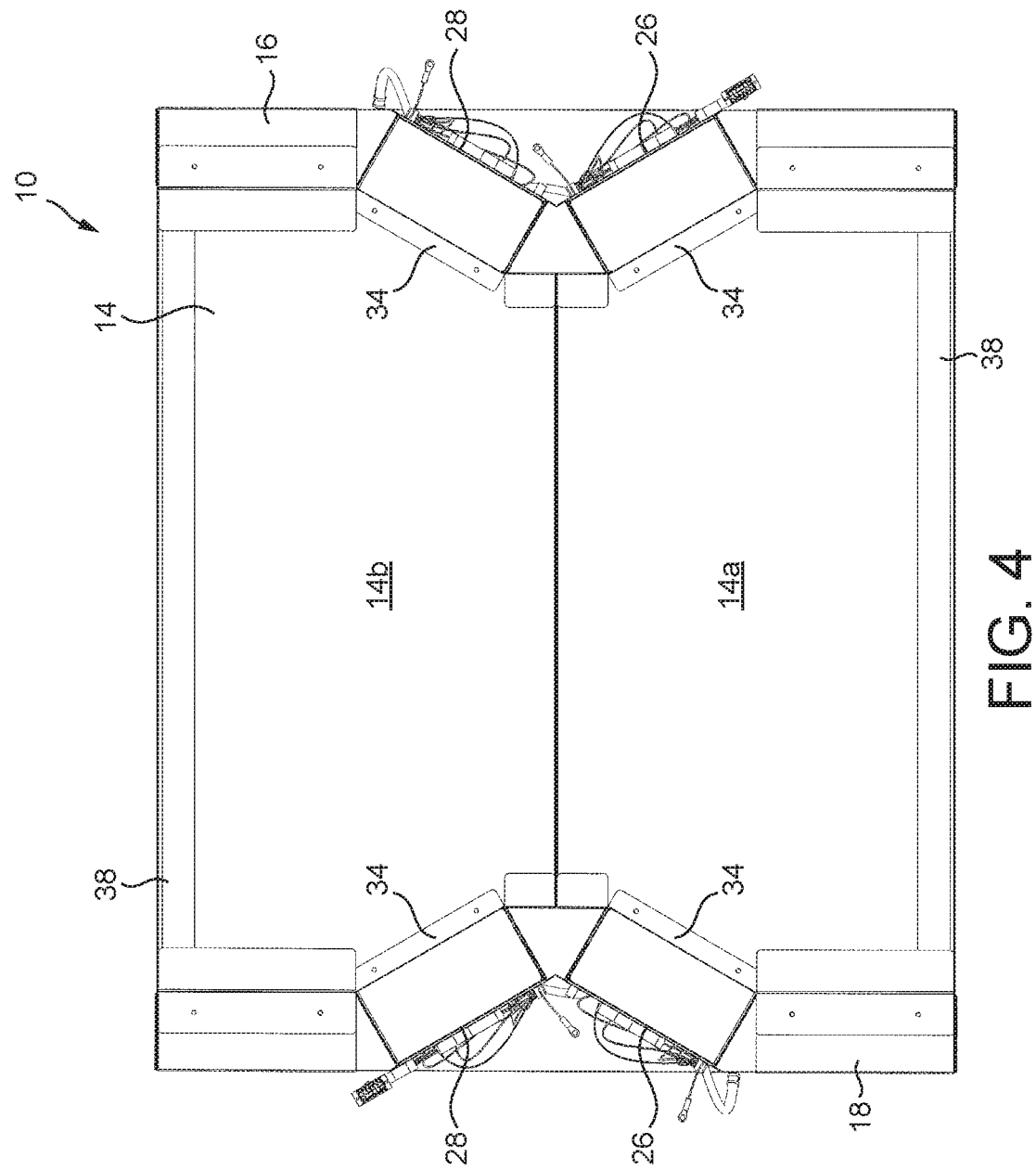
FIG. 4 shows a top plan view of the cabinet of FIG. 1.
Figure 5:
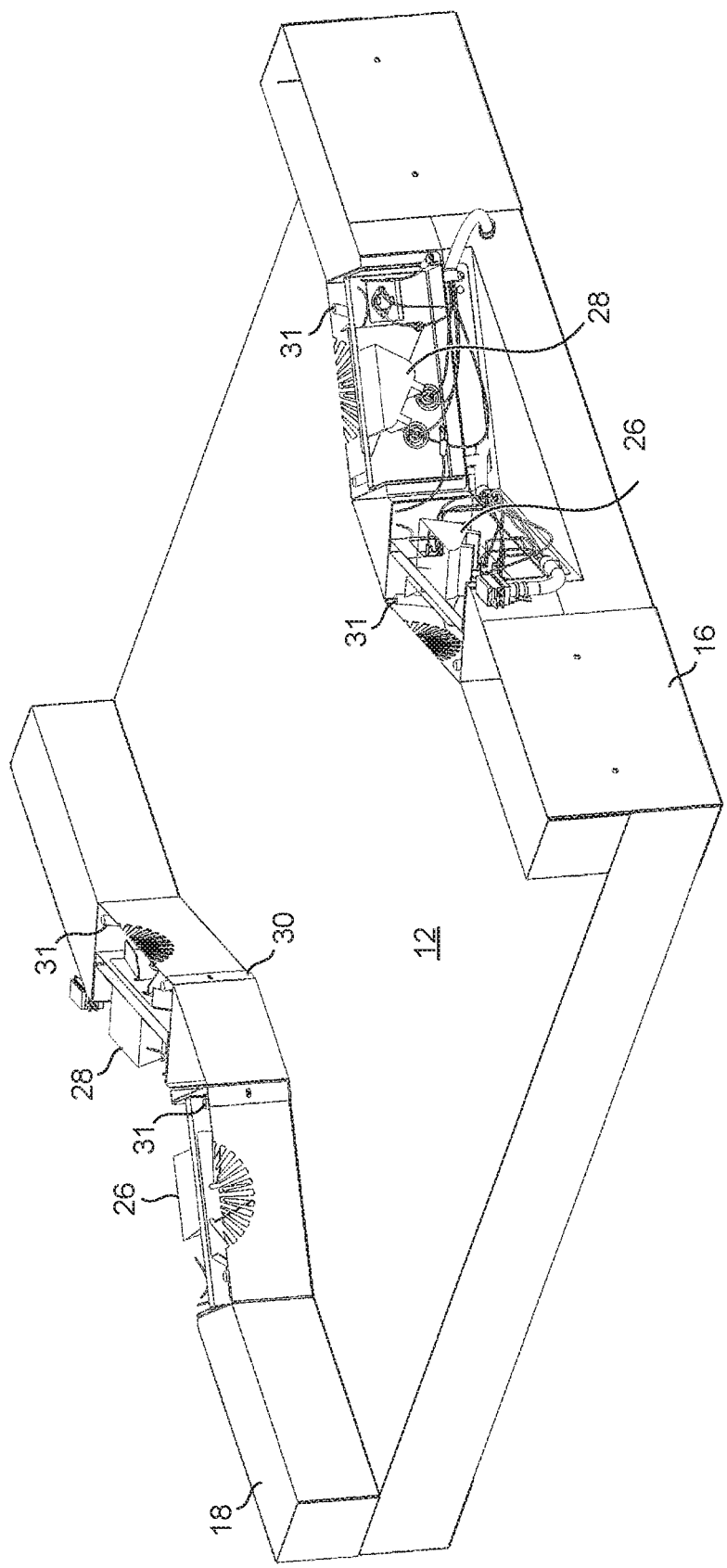
FIG. 5 shows a partially sectioned view of the cabinet of FIG. 1.
Figure 6:
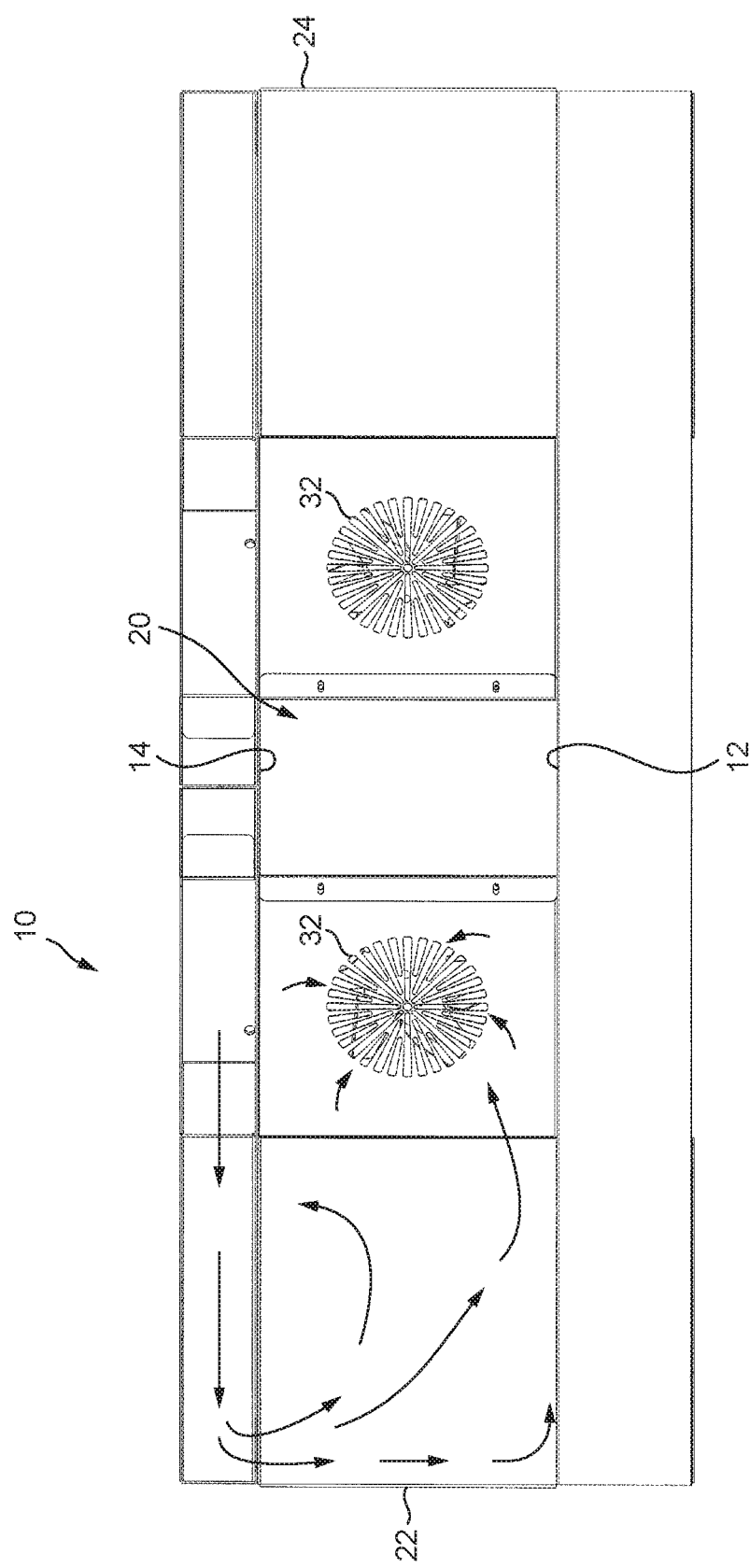
FIG. 6 shows another partially sectioned view of the cabinet of FIG. 1.

Referring to FIGS. 1 to 7 there is shown a cabinet, generally designated 10, which may be used for the temporary storage of a heated food item. As will be described in greater detail below, the cabinet 10 is intended to retard the cooling of heated food item before collection of the food item by a consumer or purchaser of the food item. The retarded cooling effect is achieved by the circulation of heated air over and around the food item.

The cabinet 10 includes a base 12, a top 14 and opposing side walls 16, 18. In the embodiment shown the top 14 is formed from two top panels 14a,14b The base 12, top 14 and side walls 16,18 define an interior space 20 of the cabinet 10 which, in use, can temporarily accommodate a heated food item. The base 12, top 14 and side walls 16,18 further define opposing rectangular apertures 22,24 which, in use, allow a food item to be placed into and retrieved from the interior space 20. The base 12, top 14 and side walls 16,18 may be formed at least in part from a thermally insulating composite material.

Each side wall 16, 18 is further provided, at approximately it's midway point with respect to the apertures 22,24 with two electric fans 26,28. Each fan 26,28 is inclined towards the closest aperture 22, 24. In the embodiment shown, fans 26 are inclined towards aperture 22 and fans 28 are inclined towards aperture 24. As can be seen from FIG. 5, the inclination of the fans 26, 28 results in a narrowing of the interior space 20 of the cabinet 10 to a throat 30 positioned substantially equidistantly within the cabinet 10 between the apertures 22,24.

Each fan 26,28 is located behind a portion of the side wall 16,18 which is provided with a plurality of inlet apertures 32. Each fan 26,28 is electrically driven and arranged to draw air from the interior space 20 of cabinet 10 through the inlet apertures 32. Air drawn by each fan 26,28 through the inlet apertures 32 is heated by heater elements 31 which are located adjacent the fans 26,28. The heater elements may, for example, comprise electrically resistive heating elements which at least partially surround the fans 26,28.

The fans 26,28 and heater elements may be operated to produce flows of air heated to a temperature of between 50 degrees Centigrade and 95 degrees Centigrade.

It will be appreciated that the width of the interior space 20 at the throat 30 defines the maximum width for food products and/or their packaging that are able to pass through the interior space 20 from one aperture 22 to the other aperture 24. It will further be appreciated that the inclination of the side walls 16,18 at the locations where the fans 26,28 are positioned may assist in moving a food product and/or its packaging into alignment with the throat 30 as the food product and/or its packaging are advanced through the cabinet 10 from one aperture 22 to the other 24. This alignment with respect to the throat 30 may ensure that a food product and/or its packaging does not foul, block or otherwise occlude the fan inlet apertures 32.

The heated air is delivered by each fan 26,28 through an outlet 34 positioned above the top panels 14a, 14b of the cabinet 10. The outlets 34 communicate with a chamber 36 which is positioned above the interior space 20 of the cabinet 10. In the accompanying figures the chamber 36 is shown to be open topped. The open top is shown for the purpose of illustrating the internal configuration of the cabinet 10. In use, a cover (not shown) overlies the top 14 of the chamber 36.

The top 14 of the cabinet 10 is provided with a pair of slots 38 each of which extends across the top 14 above an aperture 22,24 of the cabinet 10. Each slot 38 extends across substantially the whole width of the interior space 20 of the cabinet 10 and, in use, is used to form an air curtain across each aperture 22,24.

Air drawn from the interior space 20 of the cabinet 10 through the apertures 32 is heated and then delivered to the chamber 36 through the outlets 34. The heated air moves through the chamber 36 to the slots 38 whereupon it is directed downwardly through the slots 38 and across the cabinet apertures 22,24. A portion of the heated air directed through each slot 38 forms an air curtain across the respective cabinet aperture 22,24, while the remainder of the heated air circulates within the interior space 20 of the cabinet 10. Movement of the air within the cabinet as described above is indicated with arrows. As can be seen, a portion of the air delivered through each slot 38 forms an air curtain, while another portion of the air delivered through each slot 38 circulates within the interior space 20 to heat the interior space 20.

Figure 7:
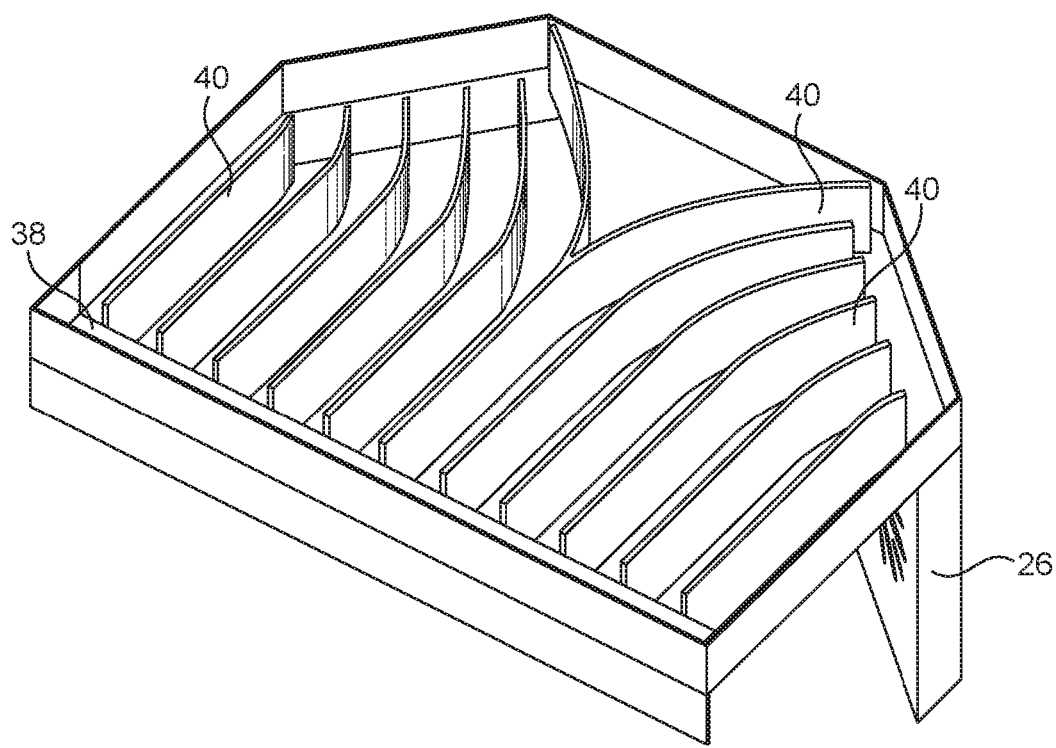
FIG. 7 shows a perspective view of a diffuser of the cabinet.

To assist with the movement of the heated air from the fan outlets 34 to the slots 38, the chamber 36 may be provided with one or more fins, vanes, baffles or other such airflow redirection means 40 as shown in FIG. 7. The redirection means 40 ensure an evenly distributed flow of heated air from the fan outlets 34 to the slots 38. This in turn ensures uniformity of the air curtains formed across the apertures 22,24.

Figure 8:
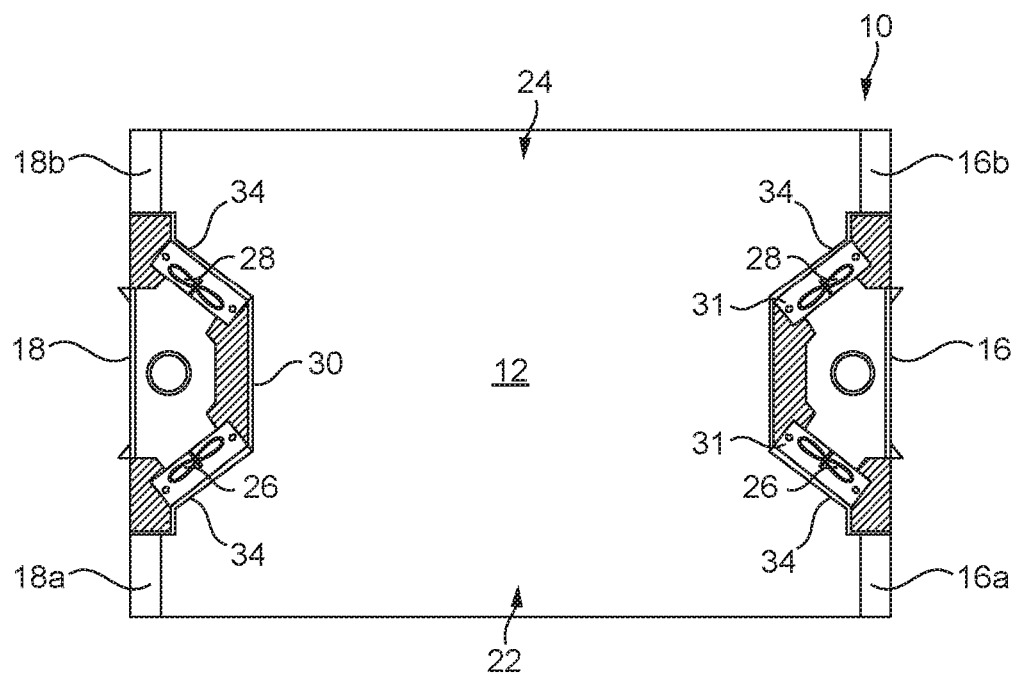
FIG. 8 shows a sectioned plan view of a cabinet of an alternative embodiment of the present invention.
Figure 9:
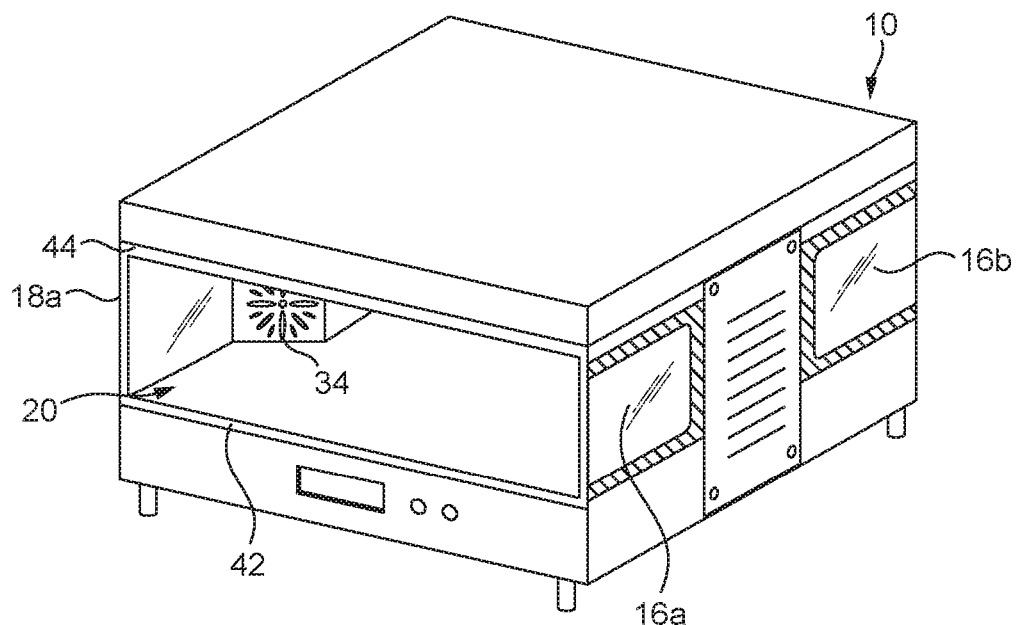
FIG. 9 shows a perspective view of the cabinet of FIG. 8.

FIGS. 8 and 9 show an alternative embodiment of the cabinet 10 described with reference to FIGS. 1 to 7. Features common to the embodiment described with reference to FIGS. 1 to 7 are identified with like reference numerals. The cabinet 10 differs in that the portions 16a,16b, 18a,18b of the side walls 16,18 adjacent the apertures 22,24 are glazed. This allows the interior space 20 of the cabinet 10 to be viewed from the side of the cabinet 10. The side wall portions 16a,16b may comprise double glazed units which serve to reduce heat transfer therethrough.

Each aperture 22,24 of the cabinet 10 is further provided with a weir 42 which extends across the lower edge of the aperture 22,24 between the side walls 16,18, and a deflector 44 which extends across the upper edge of the aperture 22,24 between the side walls 16,18. Each weir and deflector pair 42,44 acts to guide the air curtain across the aperture 22,24 with which they are associated. It will be understood that such weirs and deflectors may be utilised in conjunction with the cabinet described with reference to FIGS. 1 to 7.

Figure 10:
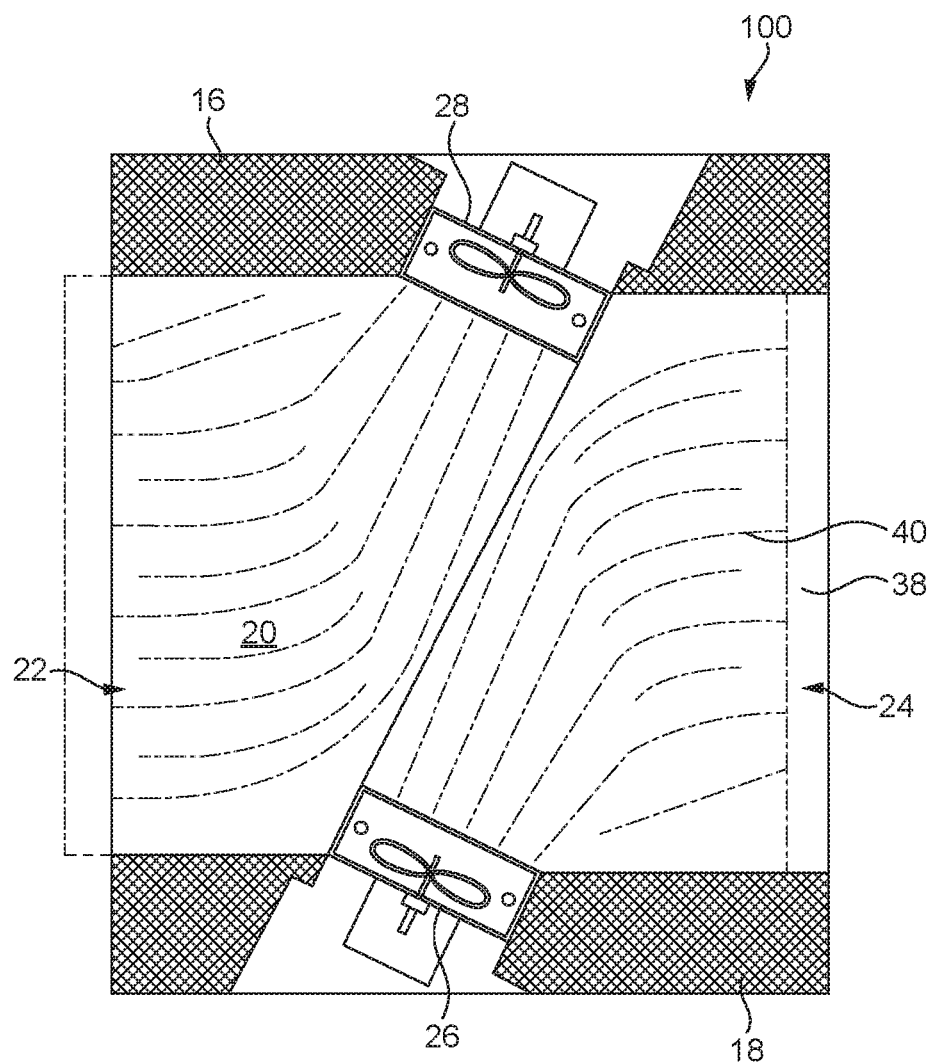
FIG. 10 shows a partially sectioned view of an alternative embodiment of a cabinet.
Figure 11:
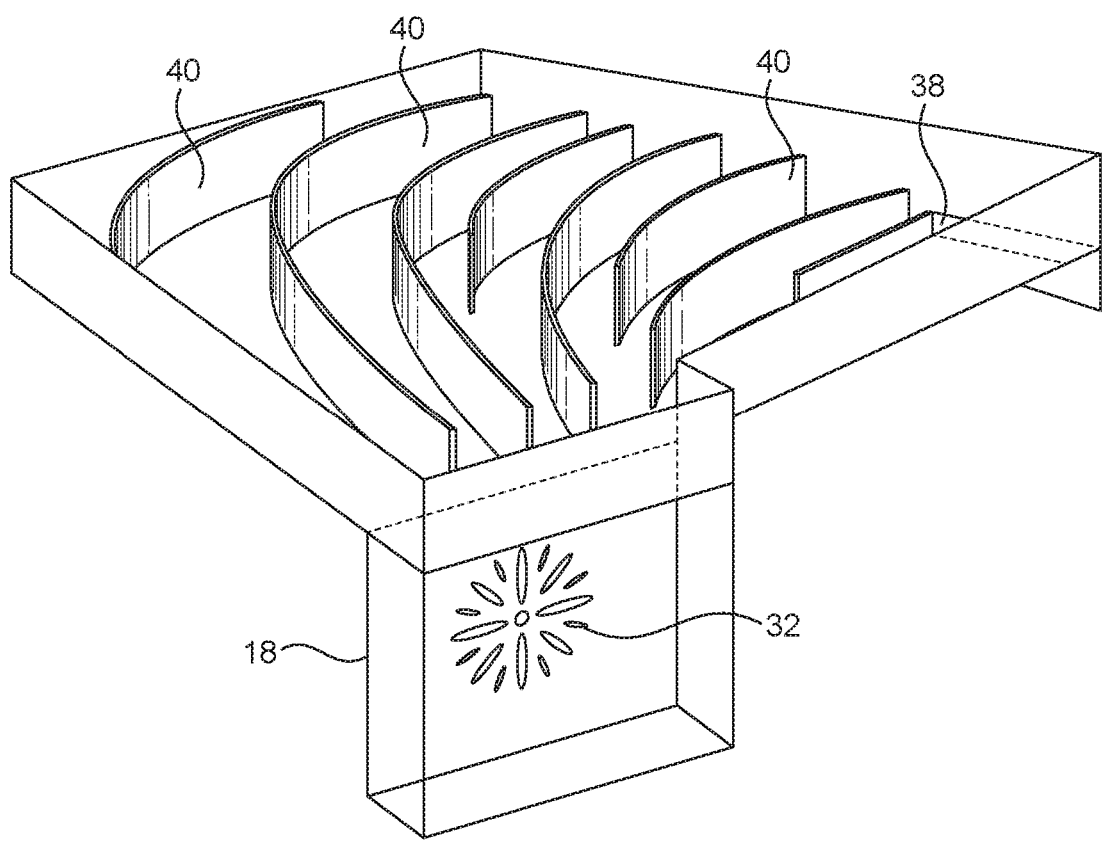
FIG. 11 shows a perspective view of a diffuser of the cabinet of FIG. 10.

Referring now to FIGS. 10 and 11 there is shown an alternative embodiment of a cabinet generally designated 100. Features common to the cabinet described with reference to FIGS. 1 to 9 identified with like reference numerals. The cabinet 100 of FIGS. 10 and 11 differs in that it is provided with a single fan 26,28 behind each side wall 16, 18.

Figure 12:
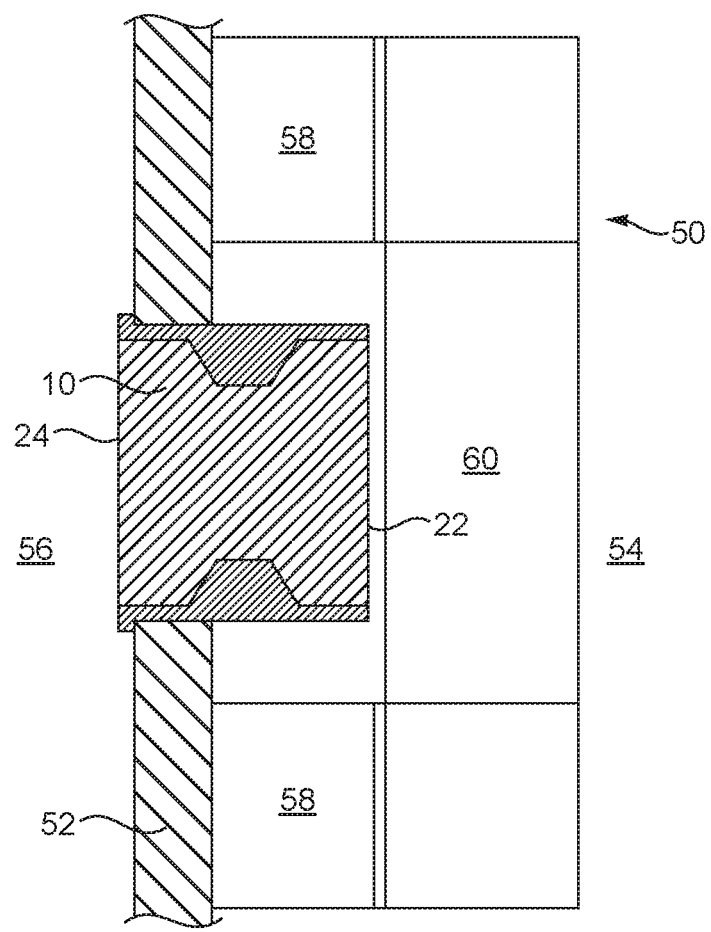
FIG. 12 shows a plan view of an installation having a cabinet according to the present invention.
Figure 13:
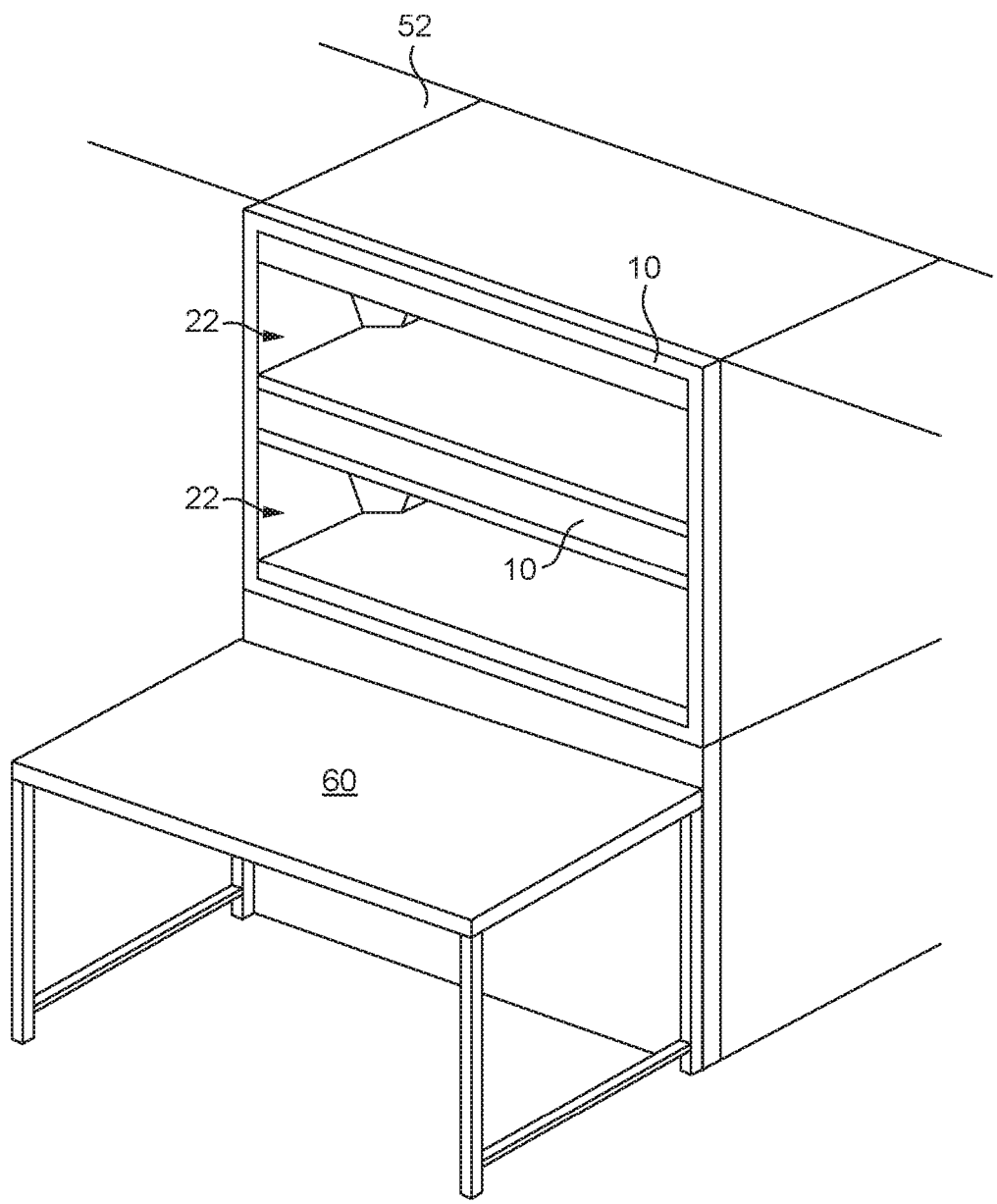
FIG. 13 shows a perspective view of the installation of FIG. 12.

Referring now to FIGS. 12 and 13 there are shown two cabinets 10 of the type hereinbefore described incorporated within an installation generally designated 50. More specifically, the cabinets 10 are incorporated into a wall or partition 52 which divides a food preparation area 54 from a food collection area 56. In the embodiment shown, the food preparation area 54 includes two ovens 58 which are positioned against the wall 52 on opposing sides of the cabinets 10. A food preparation and packaging table 60 is provided adjacent the cabinet apertures 22 on the food preparation area 54 side of the wall 52. It will be understood that cooked food products can be removed from the ovens 58 and packaged on the table 60 before being placed in the cabinets 10. The cooked and packaged food products can thereafter be removed via the cabinet apertures 24 on the opposing side of the wall 52 to the food preparation area.

FIGS. 14 to 20 show accessories which may be utilised with the cabinets 10,100 hereinbefore described. More specifically, the accessories are configured to support food products and food product containers within the cabinets 10,100.

Figure 14:
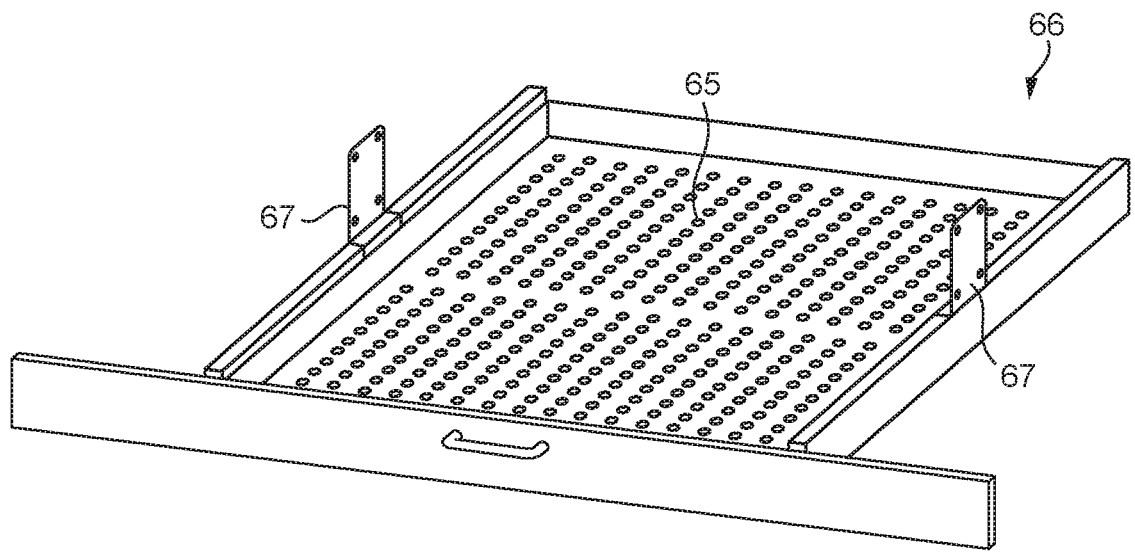
FIG. 14 shows a perspective view of a drawer unit.
Figure 16:
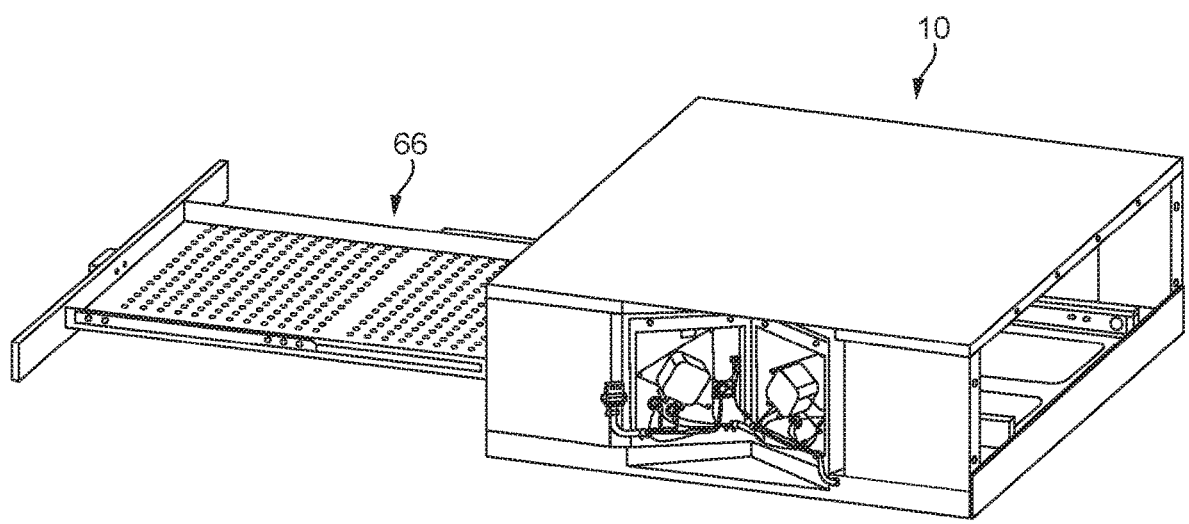
FIG. 16 shows a further perspective view of a cabinet and a drawer unit.

FIGS. 14 and 16 show a sliding drawer arrangement 66 which may be fitted to a cabinet 10,100. The drawer 66 is, in use, mounted to the throat 30 of the cabinet 10 and may be manipulated to extend out of the cabinet 10 through one of the apertures 22,24 thereof. Cooked food products can thereafter be placed on the drawer 66. The drawer 66 can then be manipulated so as to be moved back into the interior space 20 of the cabinet 10.

The drawer 66 has a perforated base 65 and is mountable to the throat 30 of the cabinet 10 by opposed mounting plates 67.

Figure 15:
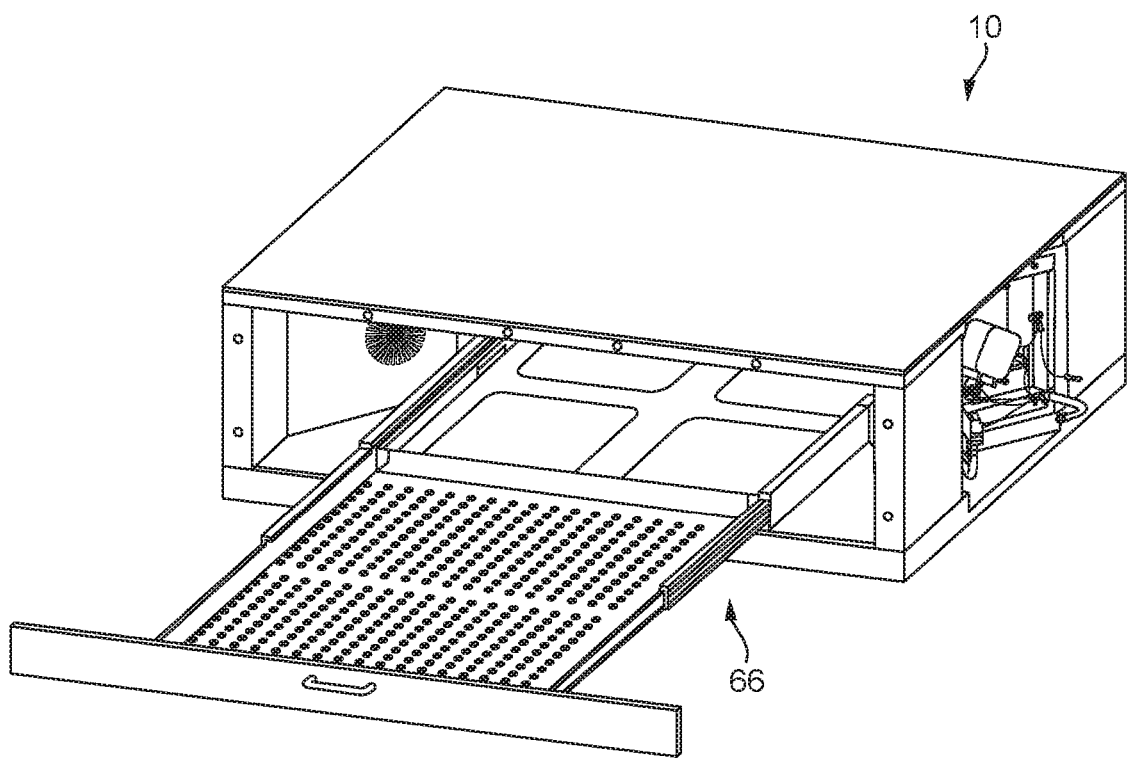
FIG. 15 shows a perspective view of a cabinet and a drawer unit.
Figure 17:
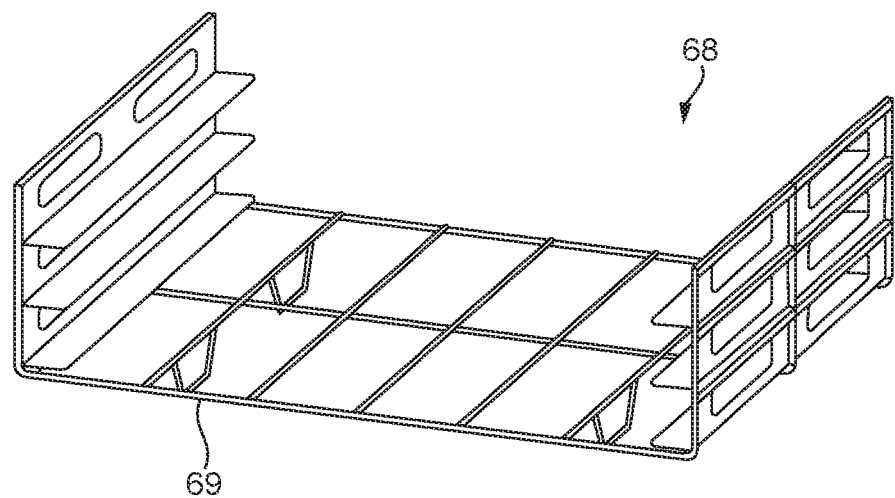
FIG. 17 shows a perspective view of a shelving unit.
Figure 18:
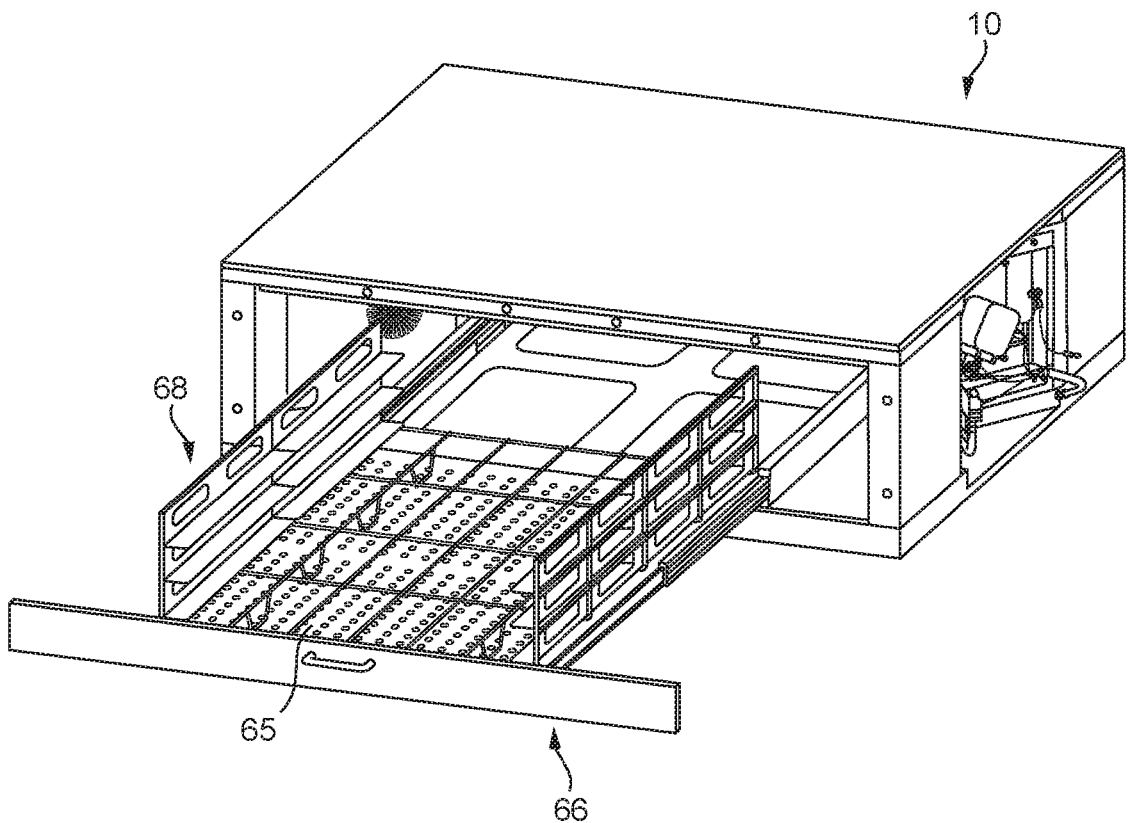
FIG. 18 shows a perspective view of the shelving unit fitted to the cabinet and drawer unit of FIG. 15.

FIGS. 17 and 18 show a shelving unit 68 for use with the drawer 66 of FIGS. 14 to 16. The shelving unit 68 is fittable to the drawer 66 so as to increase the carrying capacity of the drawer 66. The shelving unit 68 is provided with a wire base 69 which is sized to fit within the drawer 66.

Figure 19:
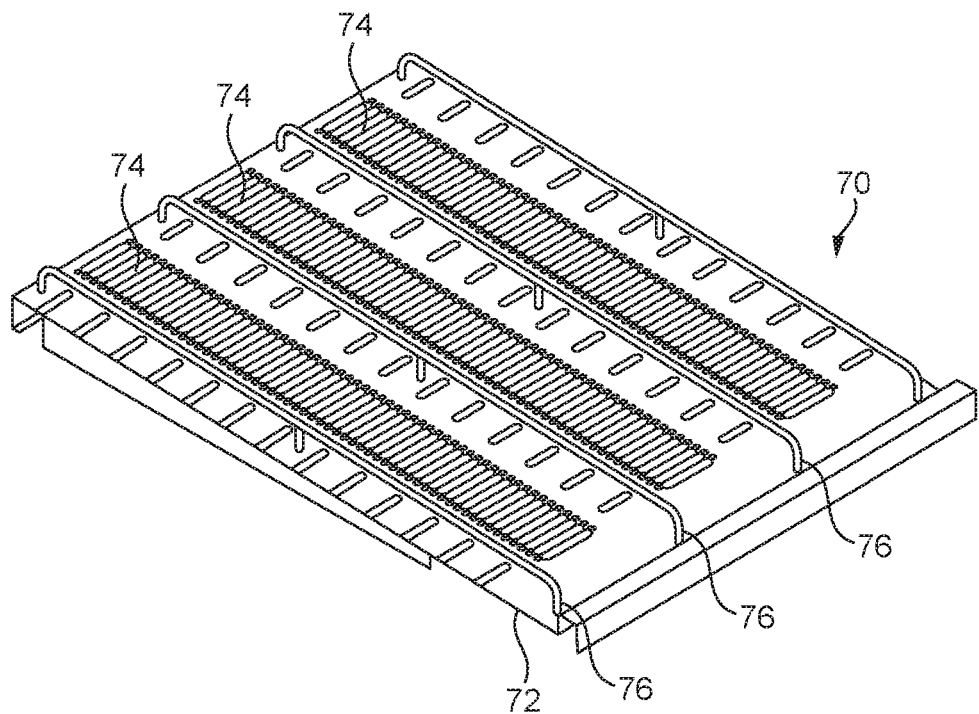
FIG. 19 shows a perspective view of a roller track arrangement.
Figure 20:
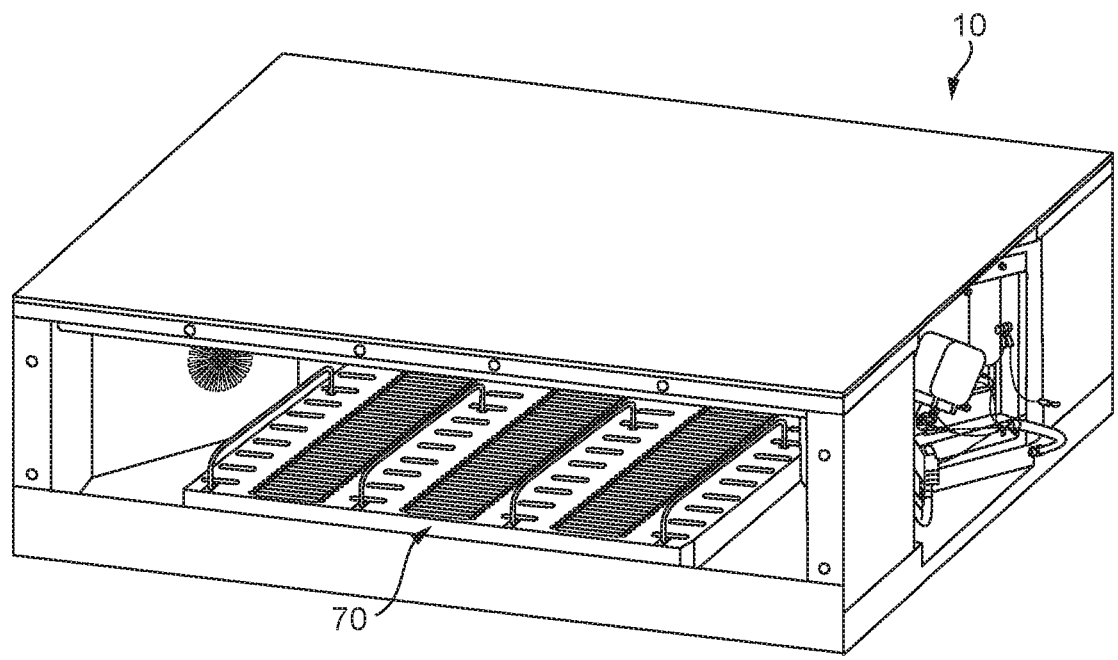
FIG. 20 shows a perspective view of the roller track arrangement and the cabinet.

FIGS. 19 and 20 show an inclined roller track arrangement 70. The roller track arrangement 70 includes an inclined frame 72 having a plurality of rollers 74. The rollers 74 may be substituted for PTFE strips or a low friction coating. The roller track arrangement 70 is further provided with guide bars 76 which guide the movement of food products or food product packaging supported by the rollers 74. In the embodiment shown the roller track arrangement is inclined in the direction of one of the access apertures. In an alternative embodiment the roller track arrangement 70 may be provided so as to lie substantially parallel to the floor of the interior space 20 of the cabinet 10.

The present invention thus provides a cabinet 10, 100 which is open at opposing ends and which can be operated so as to provide an interior space 20 which can be maintained at an elevated temperature, for example between 50 and 90 degrees centigrade. The interior space 20 is accessible though the apertures 22,24 for the purpose of inserting and removing heated food items. The air curtains act to maintain the interior space 20 of the cabinet 10 at the required elevated temperature while providing minimal impedance to the insertion and removal of heated food items.

A cabinet 10, 100 in accordance with the present invention may be used in conjunction with the temporary storage of packaged baked goods such as pizzas and flatbreads. The cabinet 10, 100 may advantageously be placed at a location between where such packaged baked goods are prepared and then collected by a purchaser or consumer. The baked goods may be removed from the oven in which they have been prepared and placed in an appropriately configured package. The package is then placed into the interior space 20 of the cabinet 10, 100, 200 through the aperture 22,24 which faces the preparation location.

The heated air circulating within the interior space 20 acts to retard the cooling of the baked goods prior to the package being removed by a purchaser or consumer of the baked goods through the other of the cabinet apertures 22,24.

A plurality of such cabinets 10, 100 may be provided one on top of another so as to provide multiple locations where packaged baked goods may be temporarily stored before collection.

Degradation of the quality of the baked goods is minimised while within the interior space 20 of the cabinet 10, 100, 200 as the package is not exposed to a directly heated surface such as, for example, an electrically heated hot plate.

The cabinet 10,100 of the present invention is not limited for use with packaged baked goods, and may be used in conjunction with any heated food item.

It will be understood that the cabinet 10,100 of the present invention is not intended to heat or cook the food items placed within the interior space 20 but instead is intended to retard the cooling of already heated food items.

The interior space 20 of the cabinet 10,100 may be provided with guide formations which, in use, guide the passage of a heated food item from one aperture 22 to the other aperture 24. The interior space 20 may further be provided with one or more shelves so as to allow heated food items to be passed through the interior space from one aperture 22 to the other aperture 24 at different levels.

The invention claimed is:

1. A cabinet for the temporary storage of a heated food item, the cabinet having a base, a top and two opposing sides, where the base, top and two opposing sides define an interior space of the cabinet which is accessible through opposing access apertures at each end of the cabinet, the interior space having a width defined between the two opposing sides and a height defined between the top and the base, wherein the cabinet is provided with air movement means and air heating means operable to draw air from the interior space of the cabinet, heat said air and utilise said heated air to produce air curtains across the opposing access apertures of the cabinet, where the width of the interior space between the side walls narrows to a throat at a point approximately midway between the opposing access apertures, and wherein the throat extends substantially along an entirety of the height of the interior space, and the width of the interior space at the throat defines a maximum width for food products and/or packaging holding the food products that are able to pass through the interior space from one of the access apertures to the other, and including an air chamber located above the top of the interior space which, in use, receives heated air from the air movement means.

2. A cabinet as claimed in claim 1 wherein a portion of said heated air is utilised to produce said air curtains and a further portion of the heated air is circulated within said interior space.

3. A cabinet as claimed in claim 1 wherein the air movement means comprise an electrically operated fan.

4. A cabinet as claimed in claim 1 wherein the air heating means comprise an electrically operated heating element.

5. A cabinet as claimed in claim 1 wherein the air movement means are positioned beside a side wall of the cabinet and on the opposite side of the side wall to the interior space of the cabinet.

6. A cabinet as claimed in claim 5 wherein the side wall is provided with one or more apertures which allow fluid communication between the interior space of the cabinet and the air movement means.

7. A cabinet as claimed in claim 1 wherein the chamber includes slots positioned above the access apertures, wherein said slots are configured to direct heated air from the chamber across the access apertures to form the air curtains.

8. A cabinet as claimed in claim 7 wherein the chamber further includes airflow direction means arranged to direct air received from the air movement means to the slots.

9. A cabinet as claimed in claim 1 wherein the interior space is provided with one or more shelves.

10. A cabinet as claimed in claim 1 wherein the interior space is provided with one or more guide means configured to guide the movement of food products through the interior space from one access aperture to the other access aperture.

11. A cabinet as claimed in claim 10 wherein the guide means comprise a drawer of the cabinet.

12. A cabinet as claimed claim 10 wherein the guide means comprise a roller bed of the cabinet.

13. A cabinet as claimed in claim 12 wherein the roller bed is inclined in the direction of one of the access apertures.

* * * * *